(12) United States Patent
Cardwell

(10) Patent No.: US 6,988,865 B2
(45) Date of Patent: Jan. 24, 2006

(54) BARREL HANDLING SYSTEM

(76) Inventor: Steven A. Cardwell, 2929 Mican Dr., Dallas, TX (US) 75212

( * ) Notice: Subject to any disclaimer, the term of this patent is extended or adjusted under 35 U.S.C. 154(b) by 188 days.

(21) Appl. No.: 10/412,543

(22) Filed: Apr. 11, 2003

(65) Prior Publication Data

US 2004/0202532 A1    Oct. 14, 2004

(51) Int. Cl.
*B65G 65/34* (2006.01)
(52) U.S. Cl. .................... 414/415; 222/166; 414/421
(58) Field of Classification Search ............... 222/166; 414/415, 419–42, 420, 421
See application file for complete search history.

(56) References Cited

U.S. PATENT DOCUMENTS

| | | | | |
|---|---|---|---|---|
| 1,958,846 A * | 5/1934 | Christensen | ................. | 134/59 |
| 2,657,815 A * | 11/1953 | Collins | ................. | 414/420 |
| 3,062,388 A * | 11/1962 | Hunter | ................. | 414/744.7 |
| 3,731,822 A * | 5/1973 | Friesen et al. | ............. | 414/618 |
| 3,741,281 A * | 6/1973 | Hauser-Lienhard | ......... | 164/253 |
| 3,986,624 A | 10/1976 | Cates, Jr. et al. | ............. | 214/23 |
| 4,122,876 A * | 10/1978 | Nalbach | ................. | 141/150 |
| 4,381,067 A * | 4/1983 | Catelli | ................. | 222/450 |
| 4,951,990 A | 8/1990 | Hollan et al. | ............. | 294/119.1 |
| 4,997,330 A * | 3/1991 | Blezard | ................. | 414/21 |
| 5,141,387 A | 8/1992 | Smith | ................. | 414/735 |
| 5,302,073 A | 4/1994 | Riemersma et al. | ......... | 414/421 |
| 5,388,953 A * | 2/1995 | Habicht | ................. | 414/810 |
| 5,496,147 A | 3/1996 | Taube | ................. | 414/607 |
| 6,089,285 A * | 7/2000 | DeStefano et al. | ......... | 141/231 |
| 6,120,231 A * | 9/2000 | Christ et al. | ................. | 414/422 |
| 6,457,511 B1 * | 10/2002 | Hackman et al. | ........... | 164/324 |
| 6,722,101 B2 * | 4/2004 | Hartness et al. | ............. | 53/247 |

* cited by examiner

*Primary Examiner*—Thomas J Brahan
(74) *Attorney, Agent, or Firm*—Scott T. Griggs; Griggs Bergen LLP

(57) ABSTRACT

A barrel handling system includes a stationary support platform, a support housing, a gripping claw, a first actuator, a second actuator, and a vibrator. The support housing is pivotably coupled to the support platform. The gripping claw is pivotably coupled to the support housing. The gripping claw has an interior shape adapted to grip and hold a barrel. The first actuator is coupled to a first portion of the gripping claw for opening and closing the gripping claw. The second actuator is coupled to a second portion of the gripping claw for driving a pivotal movement of the gripping claw relative to the support housing. The vibrator is coupled to a third portion of the gripping claw for vibrating a barrel when a barrel is held by the gripping claw. The vibrator aids in emptying the contents of a barrel more effectively and quickly.

12 Claims, 8 Drawing Sheets

BARREL HANDLING SYSTEM

TECHNICAL FIELD

The present invention relates to power-assisted systems for handling drums or barrels. In one aspect, it relates to a barrel handling system for emptying the contents of a barrel in a controlled manner and with power assistance.

BACKGROUND OF THE INVENTION

Materials to be processed, recycled, or disposed of are often stored in standard-sized 55 gallon drums or barrels. In a recycling processing plant, for example, such barrels are often transported within the plant on roller conveyors to a hopper opening. Such a hopper may feed into a large vat where materials to be recycled are deposited and mixed with solvents for processing. In the past, such barrels were tilted over and emptied into the hopper opening manually by two or more persons. However, because the contents of such a barrel may be toxic, hazardous, corrosive, and/or flammable, it would be more desirable to keep workers located at a safe distance or at a remote location away from the contents of the barrel. Also because a full barrel often weighs more than 400 pounds, there is a need for a powered and mechanized system to handle these heavy barrels to prevent injury and strain to workers.

U.S. Pat. No. 5,141,387 (Smith) discloses an apparatus for handling drums having hydraulic-powered grappling arms mounted on a boom that is extendable and retractable in elevation. The boom is also movable horizontally from side-to-side over a large work area for picking up drums of hazardous material. The grappling arms are mounted on a plate for rotation through 360 degrees, if needed, so the drum can be inverted. The boom is mounted on a tractor that is movable over the work area. However, the apparatus disclosed in this patent is not well suited for an in-plant application.

U.S. Pat. No. 5,496,147 (Taube) discloses a barrel handling device that is engagable by a conventional fork lift truck for lifting and rotating the barrel from a vertical orientation to a horizontal orientation. The lifting device includes a spring loaded latch for grabbing the rim of the barrel. However, the apparatus disclosed in this patent requires the use of a fork lift truck.

U.S. Pat. No. 4,951,990 (Hollan et al.) discloses a tractor-mounted boom and a pair of hydraulic drum clamps. The drum clamp assembly pivots through a vertical arc so that the drum is maintained in a tilted orientation while its contents are being dumped. However, the apparatus disclosed in this patent is not well suited for an in-plant application.

U.S. Pat. No. 3,762,586 (Updike, Jr.) discloses a conventional garbage truck and grab assembly mounted on an extendable and retractable boom for grasping a garbage container. However, the apparatus disclosed in this patent is not well suited for an in-plant application and requires the use of a garbage truck.

U.S. Pat. No. 3,987,916 (Cates, Jr. et al.) discloses a drum clamping assembly mounted on a conveyor for feeding combustible waste material into an incinerator or furnace. The drum is lifted from conveyor rollers and is tilted forward to allow its contents to empty into a furnace.

When a barrel contains high viscosity liquids such as sludge, paint and other tacky materials that tend to stick to the sides of the barrel, it is often difficult to quickly empty the contents thoroughly, just by holding the containing in an inverted or tilted position. Eventually such materials may drain or fall from the container, but it is typically desirable to empty the barrel quickly to save time and improve plant efficiencies. Hence, there is a need for a way to more quickly empty the contents of a barrel.

SUMMARY OF THE INVENTION

The problems and needs outlined above are addressed by embodiments of the present invention. In accordance with one aspect of the present invention, a barrel handling system is provided. The barrel handling system includes a stationary support platform, a support housing, a gripping claw, a first actuator, a second actuator, and a vibrator. The support housing is pivotably coupled to the support platform. The gripping claw is pivotably coupled to the support housing. The gripping claw has an interior shape adapted to grip and hold a barrel. The first actuator is coupled to a first portion of the gripping claw for opening and closing the gripping claw. The second actuator is coupled to a second portion of the gripping claw for driving a pivotal movement of the gripping claw relative to the support housing. The vibrator is coupled to a third portion of the gripping claw for vibrating a barrel when a barrel is held by the gripping claw.

The barrel handling system may further include a third actuator coupled between the support housing and the support platform for driving a pivotal movement of the support housing relative to the support platform. The support platform may have a shaft extending vertically therefrom and into the support housing, such that the third actuator acts on the shaft to drive the pivotal movement of the support housing relative to the support platform. The gripping claw may have a shaft extending horizontally therefrom and into the support housing, such that the gripping claw is supported by the shaft, the shaft is supported by the support housing, and the second actuator acts on the shaft to drive the pivotal movement of the gripping claw relative to the support housing. The gripping claw may further includes a base portion, a fourth actuator, and two sets of opposing arms.

The claw shaft may be fixed to base portion. The first actuator may be coupled between the base portion and a first set of the opposing arms such that the first actuator may drive the first set of opposing arms towards each other for gripping and holding a barrel. Likewise, the fourth being may be coupled between the base portion and a second set of the opposing arms such that the fourth actuator may drive the second set of opposing arms towards each other for gripping and holding a barrel. The interior shape of the gripping claw may be adapted to grip and hold a standard 55 gallon barrel, for example, as well as 30–80 gallon drums. The actuators and vibrators may be pneumatically powered, hydraulically powered, electrically powered, or any combination thereof, for example. The barrel handling system may further include a movable roller conveyor portion located adjacent to the support platform. The conveyor portion may be supported by a four-bar linkage and a fifth actuator, wherein the conveyor portion is adapted to pivot from a first position to a second position using the four-bar linkage and a pivot movement of the conveyor portion on the four-bar linkage being driven by the fifth actuator.

In accordance with another aspect of the present invention, a method of emptying the contents of a barrel may be provided. The method includes the following steps, the order of which may vary. A barrel is moved onto a movable conveyor portion and within the reach of a gripping claw of an articulator that is in a first position. The gripping claw grabs and holds the barrel. The movable conveyor portion is lowered. The articulator is pivoted about a vertical axis from the first position to a second position. The gripping claw is pivoted about a horizontal axis to empty the contents of the barrel. The barrel is vibrated as the barrel contents are emptied at the second position. The gripping claw is pivoted about the horizontal axis back to an upright position. The articulator is pivoted about the vertical axis from the second position to a third position. The barrel is released at the third position. And, the articulator is pivoted about the vertical axis from the third position to the first position.

BRIEF DESCRIPTION OF THE DRAWINGS

The above features of the present invention will be more clearly understood from consideration of the following descriptions in connection with accompanying drawings in which.

DETAILED DESCRIPTION OF PREFERRED EMBODIMENTS

Figure 1:
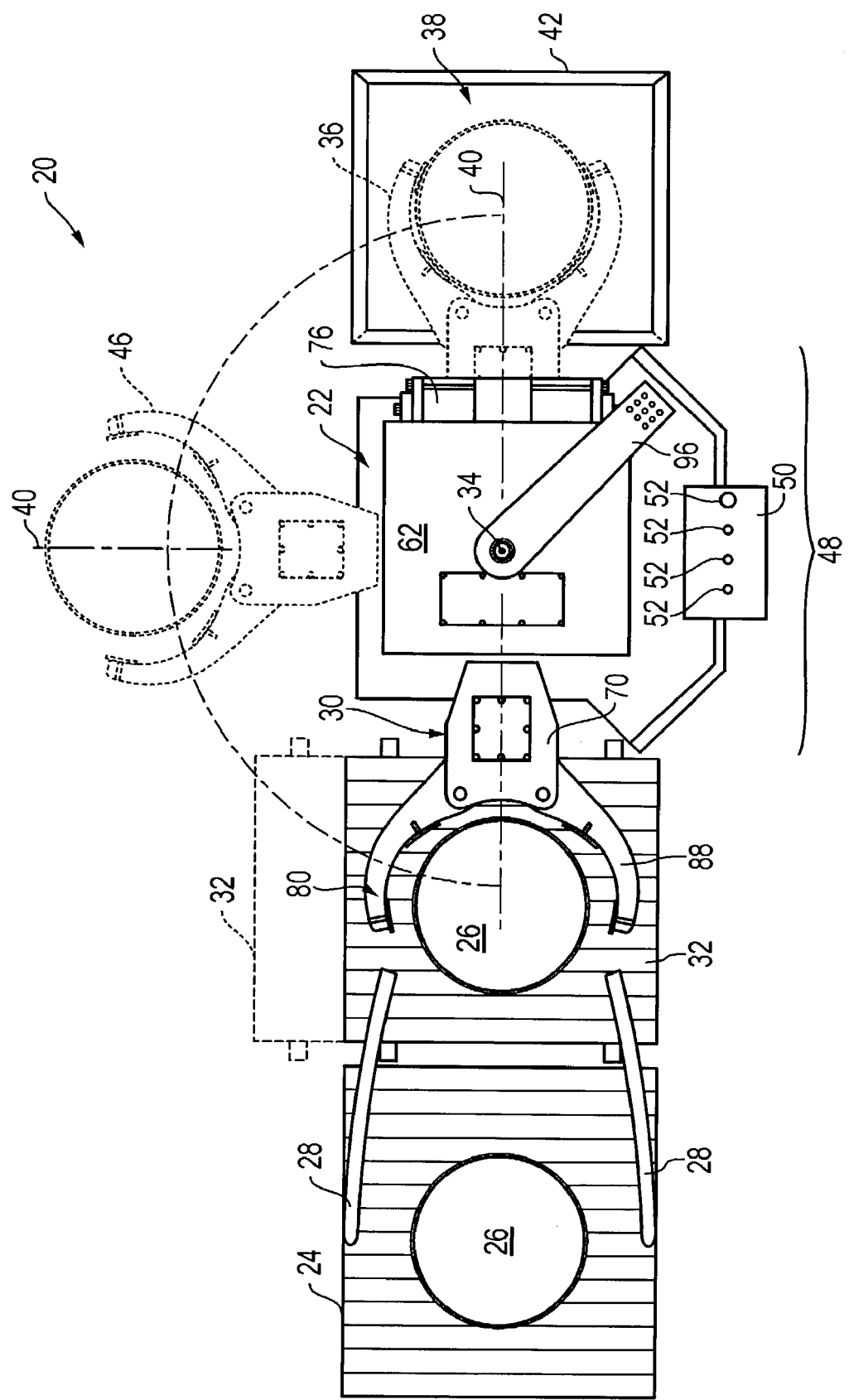
FIG. 1 is a top view of a barrel handling system in accordance with a preferred embodiment of the present invention.

Referring now to the drawings, wherein like reference numbers are used herein to designate like elements throughout the various views, a preferred embodiment of the present invention is illustrated and described. As will be understood by one of ordinary skill in the art, the figures are not necessarily drawn to scale, and in some instances the drawings have been exaggerated and/or simplified in places for illustrative purposes only. One of ordinary skill in the art will appreciate the many applications and variations of the present invention in light of the following description of a preferred embodiment of the present invention. The preferred embodiment discussed herein is just one illustrative example of the present invention and does not limit the scope of the invention to the preferred embodiment described.

The present invention relates to power assisted systems for handling barrels and for emptying the contents of the barrels in a controlled manner. Generally, an embodiment of the present invention provides a way to grab, move, invert, and vibrate a barrel to empty its contents in a controlled and power-assisted manner.

Figure 2:
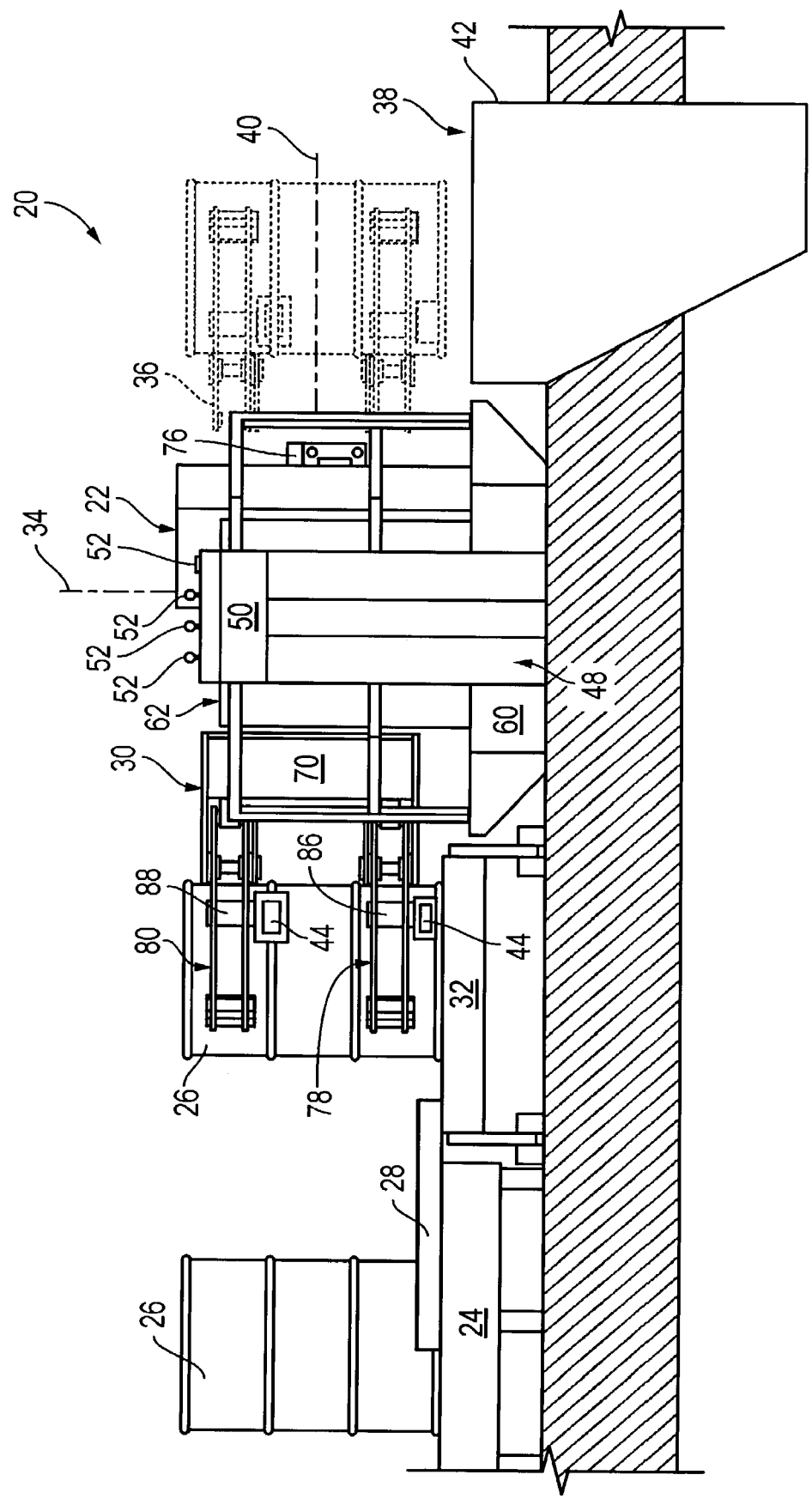
FIG. 2 is side view of the barrel handling system of FIG. 1.
Figure 3:
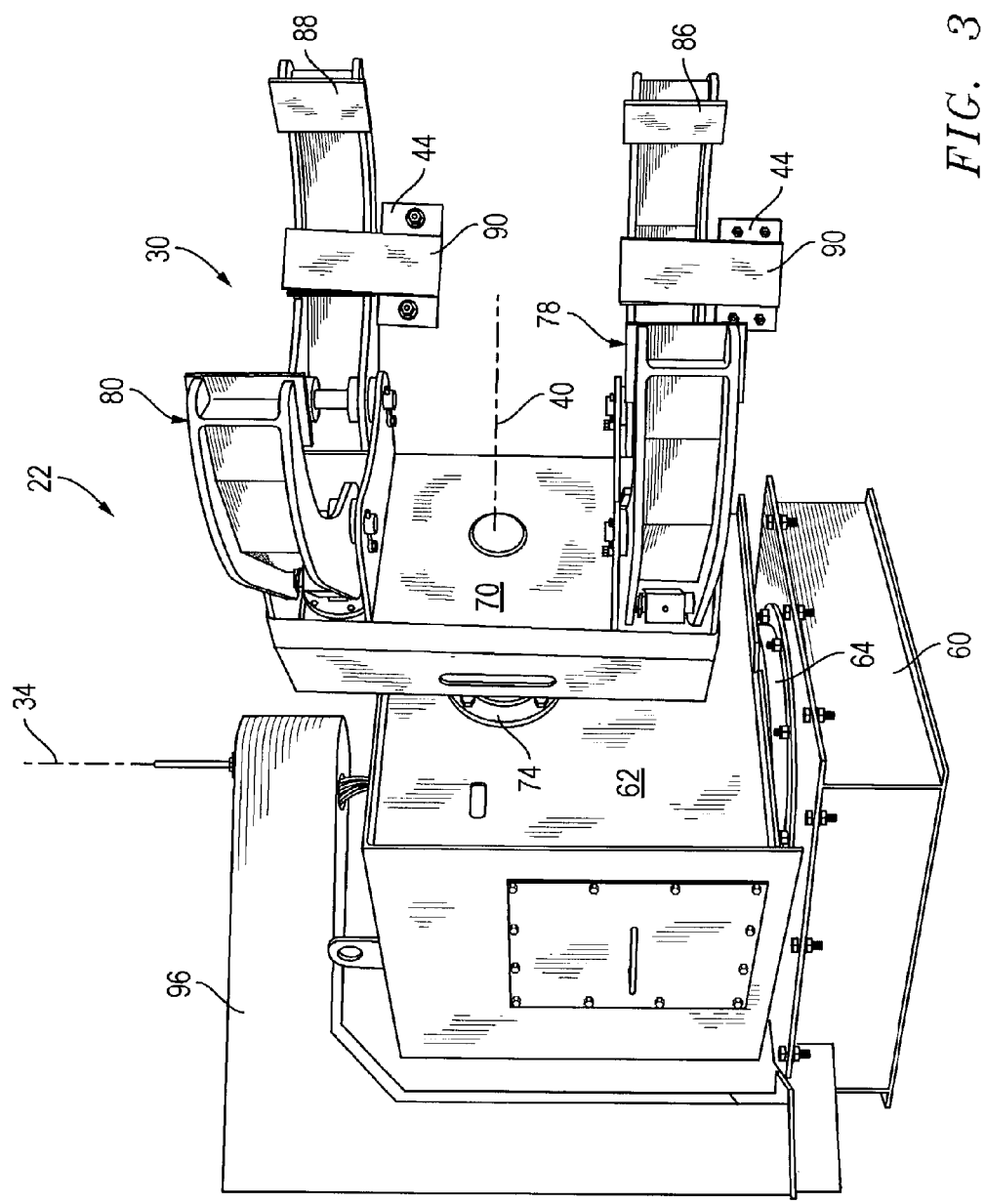
FIG. 3 is a perspective view showing the articulator of the barrel handling system.
Figure 4:
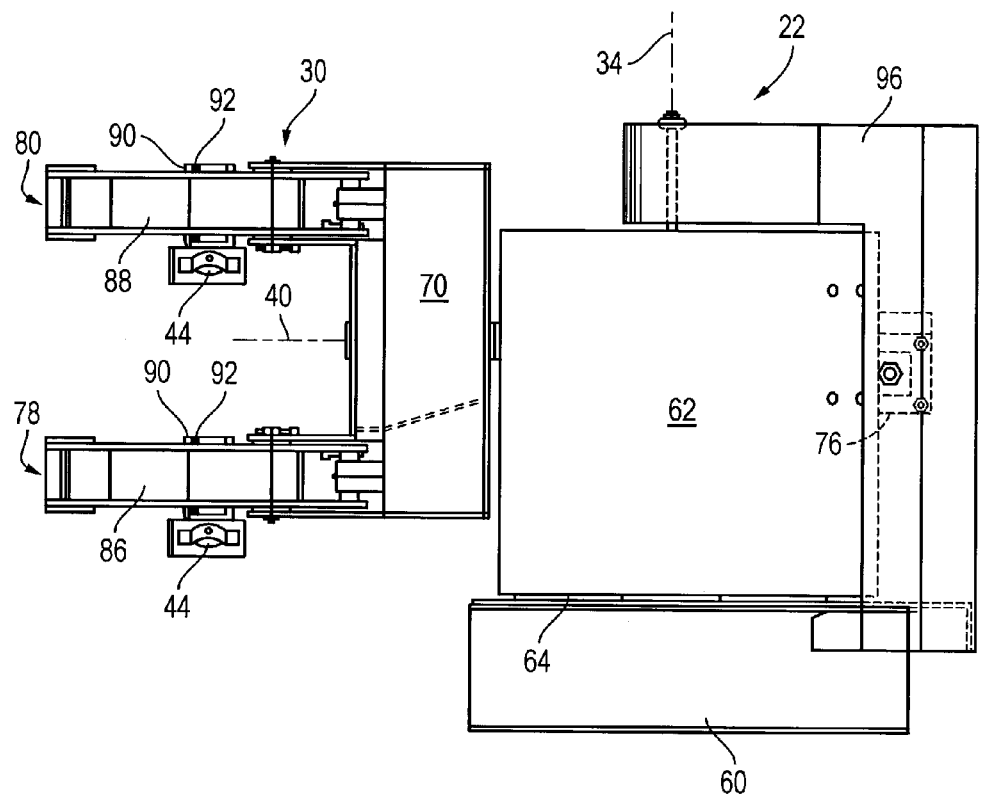
FIG. 4 is a side view of the articulator of FIG. 3.

FIG. 1 is a top view of a barrel handling system 20 in accordance with a preferred embodiment of the present invention. FIG. 2 is side view of the barrel handling system 20 of FIG. 1. FIG. 3 is a perspective view showing an articulator 22 of the barrel handling system 20. FIG. 4 is side view of the articulator 22 of FIG. 3. One possible configuration (among many) of a portion of a plant incorporating the barrel handling system 20 is shown in FIGS. 1 and 2 as an example. A roller conveyor 24 feeds the full barrels 26 toward the barrel handling system 20. The barrels 26 may be pushed along the roller conveyor 24 by a person, by a machine, and/or by gravity (i.e., inclined conveyor).

Figure 9:
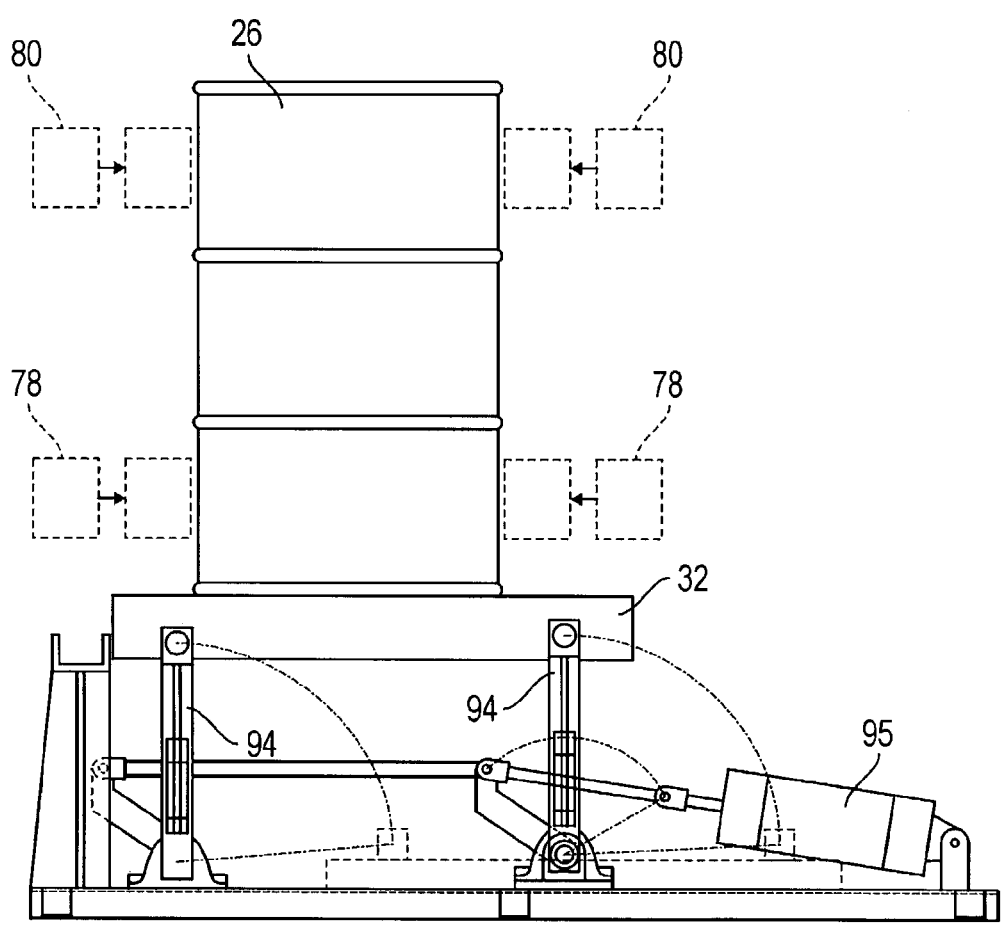
FIG. 9 is an enlarged side view of a movable conveyer section of the barrel handling system.

As a barrel 26 approaches the barrel handling system 20, guides 28 may be used to ensure that the barrel 26 is properly positioned and fed into the gripping claw 30 of the articulator 22. When the articulator 22 is in a first position, it is ready to receive a full barrel 26, as shown in FIGS. 1 and 2. When a barrel 26 is fed into the gripping claws 30, it is on a movable roller conveyor portion 32. A side view of the movable conveyor portion 32 is shown in FIG. 9 and will be described in more detail below.

Next, the gripping claw 30 grips and holds the barrel 26. After the barrel 26 is held by the gripping claw 30, the movable conveyor portion 32 drops down out of the way (see FIG. 9). Then with the movable conveyor portion 32 lowered, the articulator 22 pivots about a vertical axis 34 to a second position (shown in phantom lines 36 in FIGS. 1 and 2) holding the full barrel 26 above a hopper opening 38. With the articulator 22 in the second position 36, the gripping claw 30 is pivoted about a horizontal axis 40 to invert the barrel 26. As the barrel 26 is inverted, its contents are emptied into the hopper opening 38. The hopper 42 may empty into a large vat (not shown) below it, for example.

A pair of vibrators 44 attached the gripping claw 30 vibrate the barrel 26 while it is inverted to speed up the emptying process. After the barrel 26 is sufficiently emptied, the articulator 22 pivots about the vertical axis 34 to a third position. The third position is shown in FIG. 1 in phantom lines 46. At the third position 46 the barrel 26 is released for further processing. The gripping claw 30 may be pivoted back to an upright position before or after releasing the barrel 26. Typically the emptied barrels 26 are carried away (e.g., by another conveyor, or by a fork lift) to another process where the barrel 26 is shredded so the metal from the barrel can be sold for scrap and recycled, for example. After dropping the emptied barrel 26 at the third position 46, the articulator 22 returns to the first position. With the gripping claw 30 open and upright at the first position, the articulator 22 is ready to receive the next full barrel 26.

In the preferred embodiment, the movement of the articulator 22, the movement of the gripping claw 30, and the activation of the vibrators 44 are controlled by an operator (not shown) who stands or sits at an operator station 48 (see FIGS. 1 and 2). At the operator station 48, a control console 50 has switches and buttons 52 for controlling the articulator's functions and the movement of the movable conveyor portion 32. In other preferred embodiments (not shown), the barrel handling system 20 may be fully automated (i.e., not requiring human assistance) and computer controlled through the use of sensors and software, for example.

With the benefit of this disclosure, one of ordinary skill in the art will realize that the barrel handling system 20 and plant configuration shown in FIGS. 1 and 2 may be varied to provide many other configurations to suit a particular application or plant.

Next, the details of the barrel handling system 20 of the preferred embodiment will be described with reference to FIGS. 3–9. The articulator 22 of the barrel handling system 20 has a stationary support platform 60, which supports and anchors the articulator 22 to a floor, for example. As shown in FIGS. 6 and 7, the support platform 60 may be formed from steel channel beams welded together. A support housing 62 is pivotably coupled to the support platform 60 with a turntable bearing 64. The turntable bearing 64 supports the housing 62 and allows the support housing 62 to easily pivot about the vertical axis 34 relative to the support platform 60, with or without a load. The support housing 62 may be formed from sheets of steel cut to shape and welded together, for example. A shaft 66 is fixed to and extends from the support platform 60, and the shaft 66 extends into the support housing 62. The platform shaft 66 is aligned with the vertical axis 34.

A housing actuator 68 is attached to the housing 62 and drives the platform shaft 66. Hence, when the housing actuator 68 acts on the platform shaft 66, it causes the housing actuator 68 and the support housing 62 to pivot about the platform shaft 66 on the turntable bearings 64. The housing actuator 68 in the preferred embodiment is pneumatically driven. However, in other embodiments (not shown), the housing actuator 68 may be electrically driven or hydraulically driven in alternative. In other embodiments (not shown), the support housing 62 may be manually pivoted about the vertical axis 34 on the turntable bearing 64 and thus the housing actuator 68 may not be needed or may be an optional feature.

Figure 5:
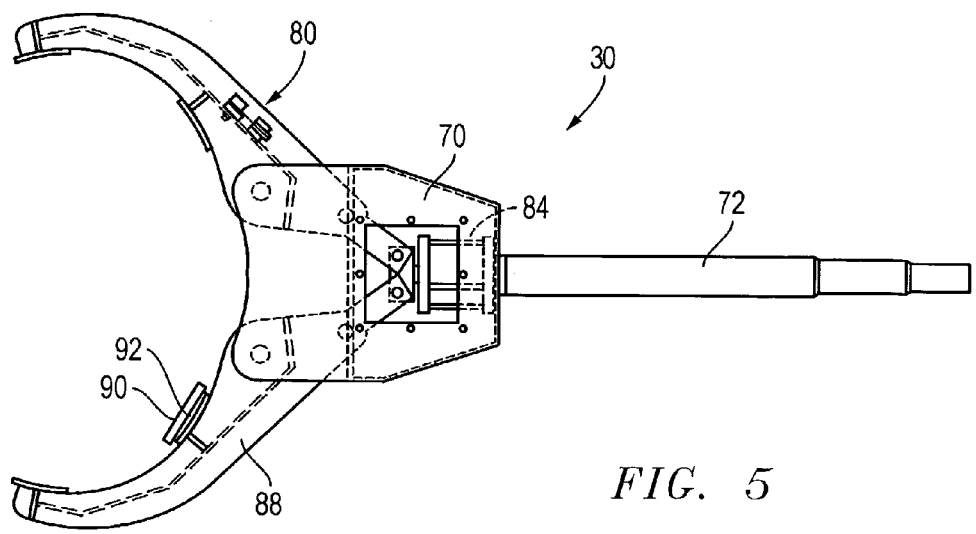
FIG. 5 is a top view showing the gripping claw for the articulator.
Figure 6:
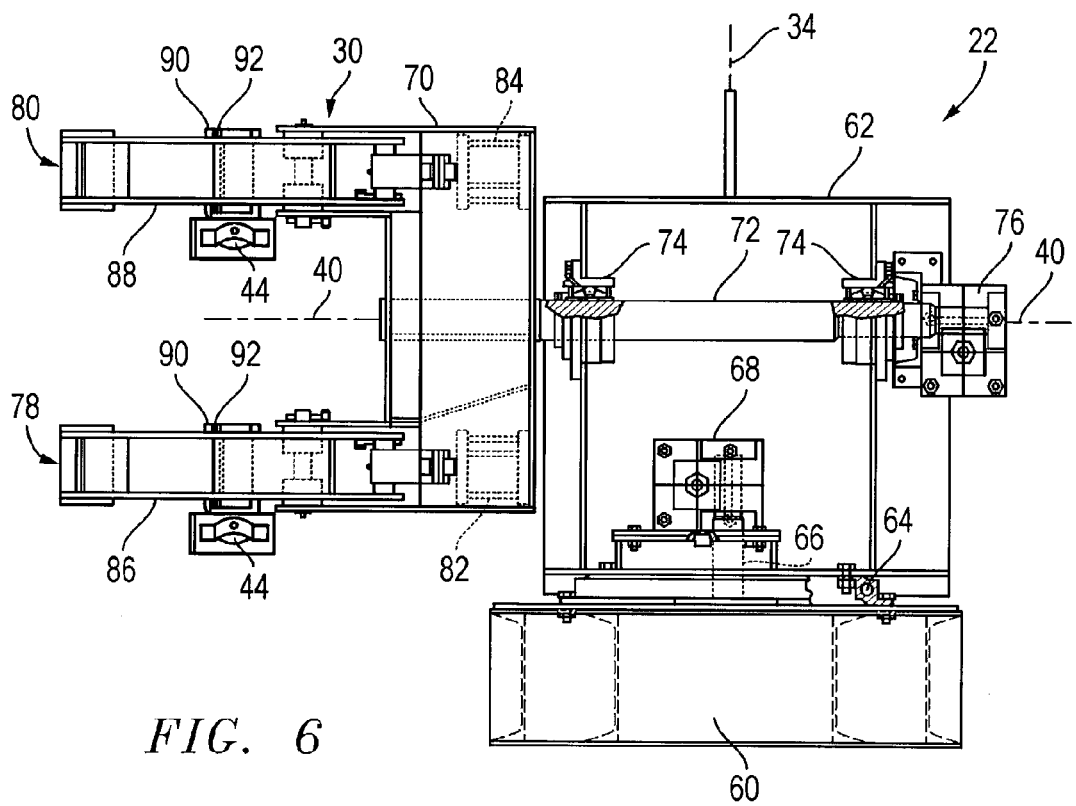
FIG. 6 is a side view of the articulator with portions cut-away.
Figure 7:
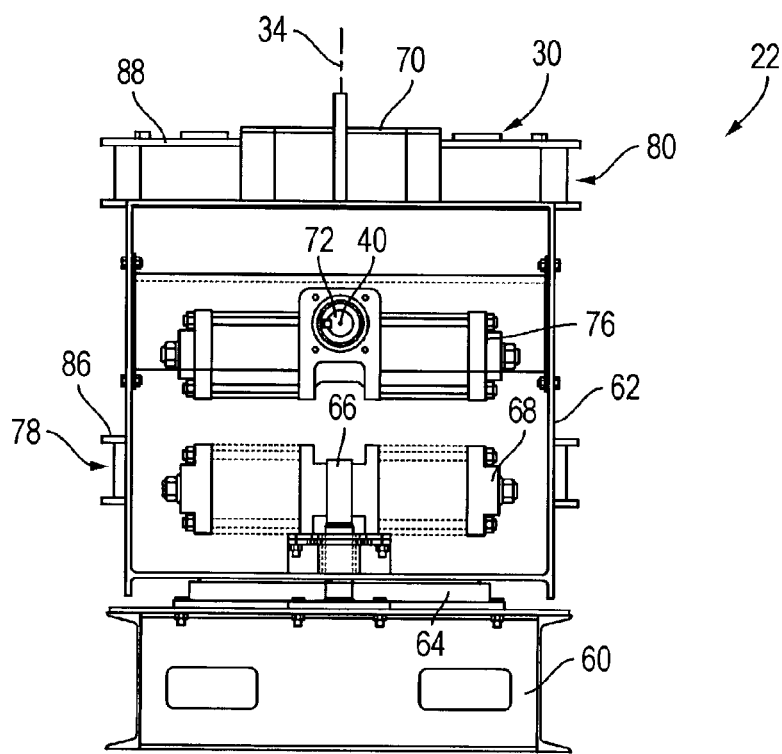
FIG. 7 is a rear view of the articulator with portions cut-away.

FIG. 5 is a top view of the gripping claw 30 from the articulator 22, and FIG. 6 shows hidden portions of the gripping claw 30. The gripping claw 30 has a base portion 70 with a claw shaft 72 fixed thereto and extending therefrom. The claw shaft 72 extends through two bearings 74 along the horizontal axis 40 through the support housing 62 (see FIG. 6). Hence, the bearings 74 of the housing 62 support the claw shaft 72, and the housing 62 supports the gripping claw 30 via the claw shaft 72.

As shown in FIGS. 6 and 7, a claw pivoting actuator 76 is fixed to the housing 62 and drives the pivotal movement of the gripping claw 30 via the claw shaft 72. The gripping claw 30 of the preferred embodiment has two sets of opposing arms 78, 80. A first set of opposing arms 78 are pivotably coupled to a lower side of the base portion 70. As shown in FIGS. 5 and 6, a first arm movement actuator 82 is linked to the opposing arms 78 for driving the opening and closing of the first set of arms 78. A second set of opposing arms 80 are pivotably coupled to an upper side of the base portion 70. A second arm movement actuator 84 is linked to the second set of opposing arms 80 for driving the opening and closing of the second set of arms 80.

The arms 78, 80 of the gripping claw 30 have an interior shape adapted to grip and hold a standard 55 gallon barrel. The claw 30 can also hold 30–80 gallon drums. The preferred embodiment can handle drums weighing up to about 800 pounds. In other embodiments (not shown), the interior shape of the gripping claw 30 may be adapted to grip and hold other size and shapes of barrels or other containers. Also, other embodiments may be adapted to handle more or less weight.

Although the preferred embodiment shown herein has two sets of opposing arms 78, 80, in other embodiments (not shown) the gripping claw 30 may have only one set of opposing arms with a greater height than those shown herein, or the gripping claw 30 may have three or more sets of opposing arms. Also, in the preferred embodiment shown herein the upper set of arms 80 is identical to the lower set of arms 78. In other embodiments, however, the arms of one set may differ from the arms of another set. Likewise, one arm may be the same or different than its opposing arm.

Figure 8:
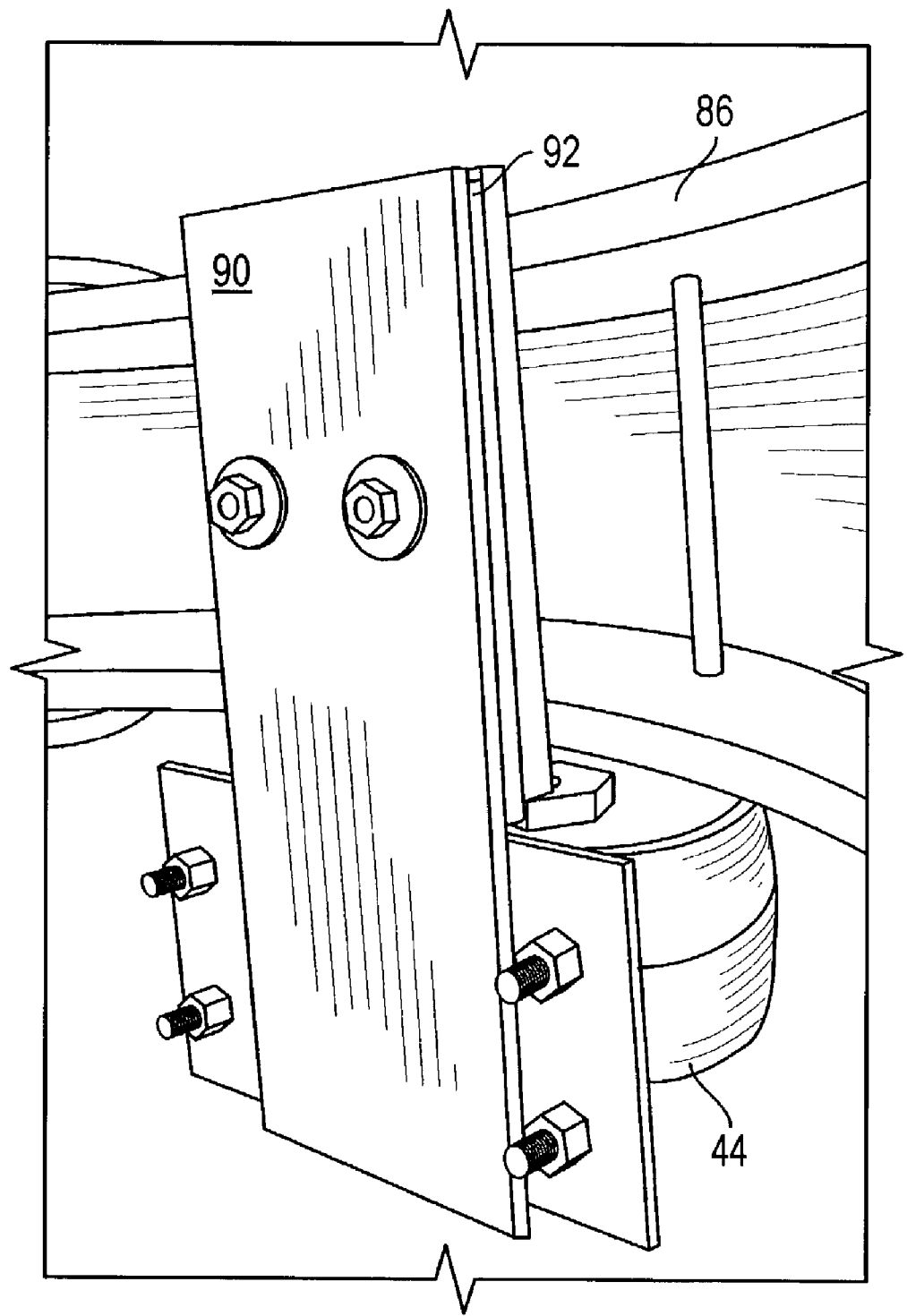
FIG. 8 is an enlarged perspective view of a vibrator attached to the gripping claw of the articulator.

As shown in FIGS. 3–6, one of the arms 86, 88 on each set has a vibrator 44 attached thereto. FIG. 8 is an enlarged perspective view of one of the vibrators 44 attached to the gripping claw 30 of the articulator 22. As shown in FIG. 8, each vibrator 44 is attached to a vibrator plate 90. A vibration isolator 92 (e.g., pad of rubber or some other vibration insulating material) is sandwiched between the vibrator plate 90 and the arm 86 or 88 to isolate some of the vibrations generated by the vibrator 44 from vibrating the arms 78, 80 and the articulator 22. The vibration isolator 92 is not essential, but is preferred to reduce vibrations exerted on the articulator components while vibrating a barrel 26 and to allow more vibration energy to be transmitted to the barrel 26. In other embodiments (not shown), the articulator 22 may have only one vibrator 44 or it may have three or more vibrators 44. The vibrator 44 of the preferred embodiment shown is pneumatically driven, but in other embodiments (not shown) the vibrator(s) may be electrically driven or hydraulically driven, for example. The size and placement of each vibrator 44 may be the same or it may vary.

One of the advantages of the preferred embodiment shown herein is that the contents of a barrel 26 may be emptied faster through use of the vibrators 44. Another advantage of the preferred embodiment shown is that all of the actuators 68, 76, 82, 84 and vibrators 44 in the system are pneumatically driven, and thus only require a single pneumatic source (e.g., one air compressor). Still another advantage is that workers do not need to manually handle the full barrels 26 while emptying them, which reduces their exposure to the contents of the barrels 26 and reduces their chances of being injured on the job.

FIG. 9 shows a side view of the movable roller conveyor portion 32 shown in FIGS. 1 and 2. The conveyor portion 32 is located adjacent to the support platform 60. As discussed above, when the gripping claw 30 has grabbed and is holding a barrel 26 resting on the movable conveyor portion 32, the movable conveyor portion 32 drops down out of the way so that the articulator 22 can pivot while holding the barrel 26 without being obstructed by the conveyor portion 32 and without the need to lift the barrel 26 upwards to clear the conveyor portion 32. The movable conveyor portion 32 is supported by a four-bar linkage 94.

In the preferred embodiment shown, the four-bar linkage 94 has an equal-arm-length configuration, which allows the conveyor portion 32 to be lowered while remaining parallel to the floor. However, in other embodiments (not shown), the four-bar linkage 94 may have unequal-length arms. Also, other mechanisms and kinematics (not shown) may be implemented to provide different movement paths for the conveyor portion 32. The goal is to get the conveyor portion 32 out of the way so that it does not obstruct the motion of the articulator 22 when the gripping claw 30 holds a barrel 26. The movement of the movable conveyor portion is driven by a conveyor actuator 95. The conveyor actuator is preferably pneumatically powered, but it also may be hydraulically powered or electrically powered, for example.

Referring again to FIGS. 3 and 4, a hose arm 96 is shown extending from the support platform 60 to the top side of the support housing 62. The hose arm 96 provides a housing to route some of the pneumatic hoses to the actuators in the articulator 22. The air hoses (not shown) are routed through the hose arm 96 and feed into the center of the top side of the support housing 62 so that the support housing 62 can pivot without binding or tangling the air hoses leading into the support housing 62. The hose arm 96 need not provide any structural support for the support housing 62, but in other embodiments (not shown) it may. Also, the hose arm 96 is not an essential feature, but is preferred to protect the air hoses from being damaged when the articulator 22 moves.

Figure 10:
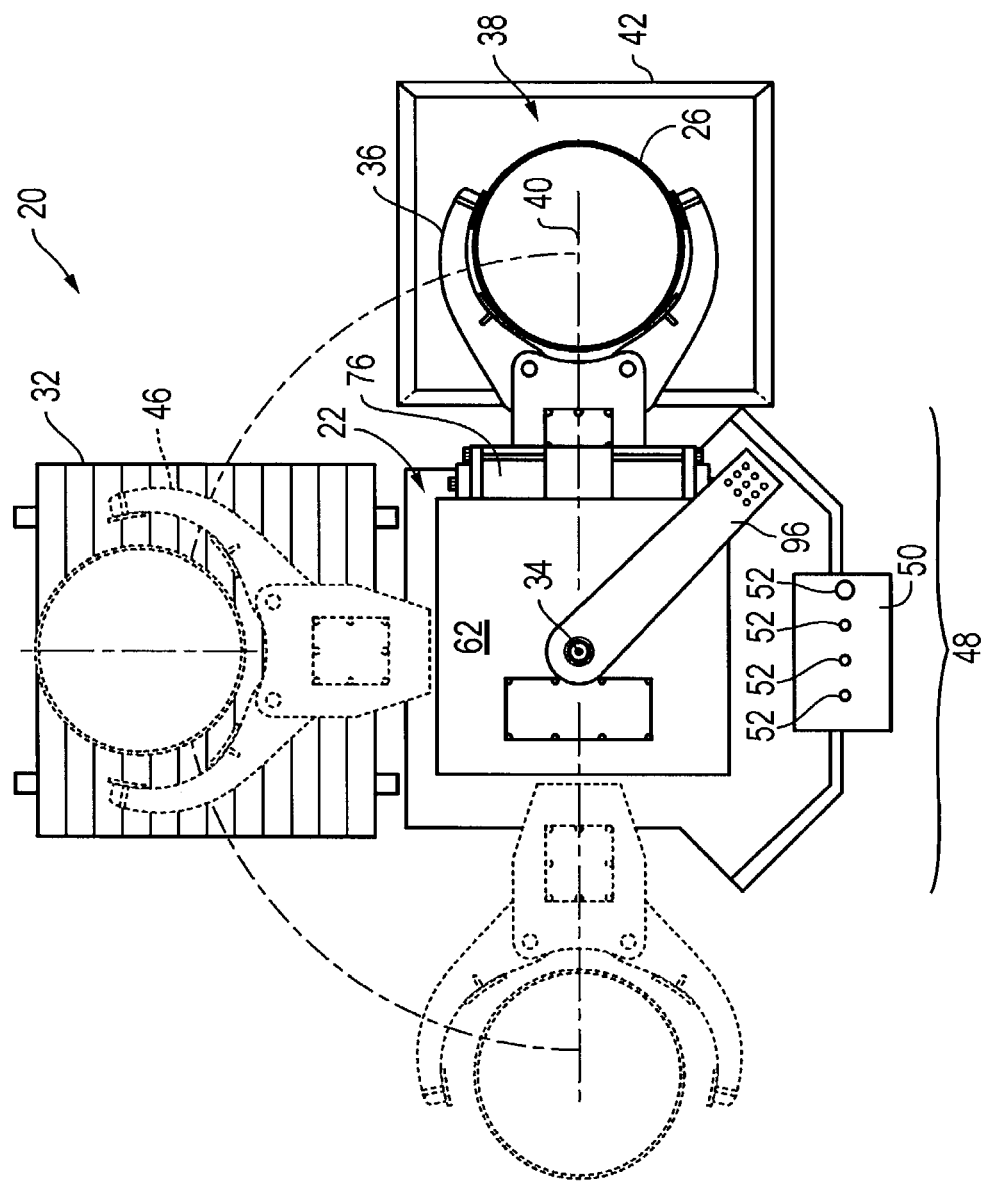
FIG. 10 is a top view of another embodiment having a different delivery position for the conveyor.

In another embodiment shown in FIG. 10, the conveyor 24 may be positioned adjacent the hopper 42.

Although the invention has been described with reference to certain exemplary arrangements, it is to be understood that the form of the invention shown and described is to be treated as a preferred embodiment. In light of the description herein, various changes, substitutions, and modifications may be realized without departing from the spirit and scope of the invention as defined by the appended claims.

I claim:

1. A barrel handling system comprising:
a support platform;
a support housing pivotably coupled to the support platform;
a gripping claw pivotably coupled to the support housing for pivoting about a vertical axis, the gripping claw having an interior profile that grips and holds a barrel, an actuator arm portion and a support shaft portion, the support shaft portion extending into the support housing such that the gripping claw is supported by the shaft and the shaft is supported by the support housing;
a first actuator coupled to the arm portion of the gripping claw for opening and closing the gripping claw;
a second actuator coupled to the support shaft portion of the gripping claw for rotating the gripping claw relative to the support housing about a horizontal axis, thereby inverting the barrel; and
a vibrator coupled to a third portion of the gripping claw, the vibrator, responsive to the inversion of the barrel, for vibrating the barrel to empty barrel contents,
wherein the gripping claw further includes a base portion, a third actuator, and two sets of opposing arms, the shaft being fixed to base portion, the first actuator being coupled between the base portion and a first set of the opposing arms such that the first actuator is operable to the first set of opposing arms towards each other for gripping and holding a barrel, the third actuator being coupled between the base portion and a second set of the opposing arms such that the third actuator can drive the second set of opposing arms towards each other for gripping and holding a barrel.

2. The barrel handling system of claim 1, further comprising a support actuator coupled between the support housing and the support platform for driving a pivotal movement of the support housing relative to the support platform.

3. The barrel handling system of claim 2, wherein the support platform has a shaft extending vertically therefrom and into the support housing, such that the support actuator acts on the shaft to drive the pivotal movement of the support housing relative to the support platform.

4. The barrel handling system of claim 1, wherein the interior shape of the gripping claw is adapted to grip and hold a 55 gallon barrel.

5. The barrel handling system of claim 1, wherein the actuators are pneumatically powered.

6. The barrel handling system of claim 1, wherein the actuators are hydraulically powered.

7. The barrel handling system of claim 1, wherein the actuators are electrically powered.

8. The barrel handling system of claim 1, wherein the vibrator is pneumatically powered.

9. The barrel handling system of claim 1, further comprising a second vibrator attached to a fourth portion of the gripping claw for vibrating a barrel when a barrel is held by the gripping claw.

10. The barrel handling system of claim 1, further comprising a movable roller conveyor portion located adjacent to the support platform, the conveyor portion being supported by a four-bar linkage and a fourth actuator, wherein the conveyor portion is adapted to pivot from a first position to a second position using the four-bar linkage and a pivot movement of the conveyor portion on the four-bar linkage being driven by the fourth actuator.

11. A barrel handling system comprising:
a stationary support platform;
a fixed pivot shaft mounted upright on and extending from the support platform along a vertical axis;
a support housing pivotably coupled to the support platform by a turntable bearing;
a housing actuator coupled between the support housing and the fixed pivot shaft, such that pivotal movement of the support housing relative to and about the fixed pivot shaft is operable to be driven by the housing actuator;
a gripping claw having two sets of opposing arms pivotably coupled to a base portion of the gripping claw for pivoting about the vertical axis, the interior shape and configuration of the arms gripping and holding a barrel within the gripping claw;
a first claw actuator coupled to a first of the opposing arm sets, such that opening and closing of the first set of opposing arms are operable to be driven by the first claw actuator;
a second claw actuator coupled to a second of the opposing arm sets, such that opening and closing of the second set of opposing arms are operable to be driven by the second claw actuator;
a gripping claw shaft attached to base portion, the gripping claw shaft extending into and supported by the support housing along a horizontal axis;
a claw pivot actuator coupled between the support housing and the claw shaft, such that pivotal movement of the claw about the horizontal axis and the claw shaft is operable to be driven by the claw pivot actuator;
a first vibrator attached to the first set of opposing arms; and
a second vibrator attached to the second set of opposing arms.

12. The barrel handling system of claim 11, wherein the actuators and vibrators are pneumatically powered.

* * * * *